(12) United States Patent
Shah et al.

(10) Patent No.: US 10,482,066 B2
(45) Date of Patent: Nov. 19, 2019

(54) GRANSETS FOR MANAGING CONSISTENCY GROUPS OF DISPERSED STORAGE ITEMS

(71) Applicant: NetApp Inc., Sunnyvale, CA (US)

(72) Inventors: Devang Kundanlal Shah, San Jose, CA (US); Dipankar Roy, San Jose, CA (US); Krishnaveni Budati, Fremont, CA (US); Kai Tan, Cary, NC (US); Pranab Patnaik, Cary, NC (US); Akhil Kaushik, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 669 days.

(21) Appl. No.: 15/140,992

(22) Filed: Apr. 28, 2016

(65) Prior Publication Data
US 2017/0316029 A1 Nov. 2, 2017

(51) Int. Cl.
*G06F 16/20* (2019.01)
*G06F 16/178* (2019.01)
*G06F 16/11* (2019.01)
*G06F 3/06* (2006.01)

(52) U.S. Cl.
CPC .......... *G06F 16/178* (2019.01); *G06F 3/0605* (2013.01); *G06F 3/065* (2013.01); *G06F 3/067* (2013.01); *G06F 3/0665* (2013.01); *G06F 16/122* (2019.01); *G06F 16/128* (2019.01)

(58) Field of Classification Search
None
See application file for complete search history.

(56) References Cited

U.S. PATENT DOCUMENTS

| | | | | |
|---|---|---|---|---|
| 7,308,545 | B1 * | 12/2007 | Kekre | G06F 11/2097 707/999.202 |
| 2005/0071710 | A1 * | 3/2005 | Micka | G06F 11/2058 714/6.12 |
| 2012/0151164 | A1 * | 6/2012 | Nayak | G06F 11/2094 711/162 |

(Continued)

FOREIGN PATENT DOCUMENTS

WO 01/61495 A1 8/2001

OTHER PUBLICATIONS

Int. Search Report/Written Opinion cited in PCT/US2017/029285 dated Aug. 1, 2017, 14 pgs.

*Primary Examiner* — Belix M Ortiz Ditren
(74) *Attorney, Agent, or Firm* — Cooper Legal Group, LLC

(57) ABSTRACT

One or more techniques and/or computing devices are provided for managing an arbitrary set of storage items using a granset. For example, a storage controller may host a plurality of storage items and/or logical unit numbers (LUNs). A subset of the storage items are grouped into a consistency group. A granset is created for tracking, managing, and/or providing access to the storage items within the consistency group. For example, the granset comprises application programming interfaces (APIs) and/or properties used to provide certain levels of access to the storage items (e.g., read access, write access, no access), redirect operations to access either data of an active file system or to a snapshot, fence certain operations (e.g., rename and delete operations), and/or other properties that apply to each storage item within the consistency group. Thus, the granset provides a persistent on-disk layout used to manage an arbitrary set of storage items.

20 Claims, 16 Drawing Sheets

(56) References Cited

U.S. PATENT DOCUMENTS

2013/0145064 A1\* 6/2013 Radovanovic .......... G06F 13/38
710/113
2015/0046668 A1\* 2/2015 Hyde, II ................. G06F 3/065
711/162

\* cited by examiner though a software defined architecture, using synchronous replication, and is not limited to merely two storage controllers.

GRANSETS FOR MANAGING CONSISTENCY GROUPS OF DISPERSED STORAGE ITEMS

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller (e.g., such that the first storage controller has write access to the secondary storage device such as for replicating data into the secondary storage device), but accessible to the second storage controller (e.g., a failover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical and/or logical replication, the storage device, comprising the replicated data, is owned by the first storage controller until a failover to the second storage controller occurs where the second storage controller is explicitly made to have read and write access. In this way, physical and/or logical replication may be implemented.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage item (e.g., a file, a LUN, a LUN spanning multiple volumes, a directory, a volume, or any other type of object) by the first storage controller and remotely implemented upon a second storage item (e.g., maintained as a fully synchronized copy of the first storage item) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage item, and using incremental transfers to send the data differences to the second storage controller for implementation upon the second storage item. Semi-synchronous replication may be achieved where an acknowledgment back to a client for a write request is based upon local implementation upon the first storage item, but is not dependent upon remote implementation upon the second storage item.

Unfortunately, a client may have an interest in replicating merely a subset of storage items, such as an arbitrary grouping of files and/or LUNs within a volume (e.g., within different directories of the volume), across multiple volumes, and/or across multiple storage controllers. Thus volume level replication techniques may waste computing resources and bandwidth by replicating the entire volume, such as data with which the client does not have an interest in replicating (e.g., a test directory, a temporary directory, a test storage virtual machine, etc.). Such inefficiencies become even more problematic as the size of volumes increase.

File systems may lack the ability to group and manage a dispersed set of storage items. For example, file systems merely provide root and sub-directories as containers for storage items. File systems do not provide a mechanism to group disperse sets of storage items that may be distributed across multiple sub-directories (e.g., a first subset of files within a first sub-directory and a second subset of files within a second sub-directory). File systems do not allow storage items of different types to be contained within the same directory. Also, file systems do not have a way to apply the same set of properties to the dispersed set of storage items. Thus, there is a need for grouping and managing dispersed sets of storage items.

DETAILED DESCRIPTION

Figure 1:
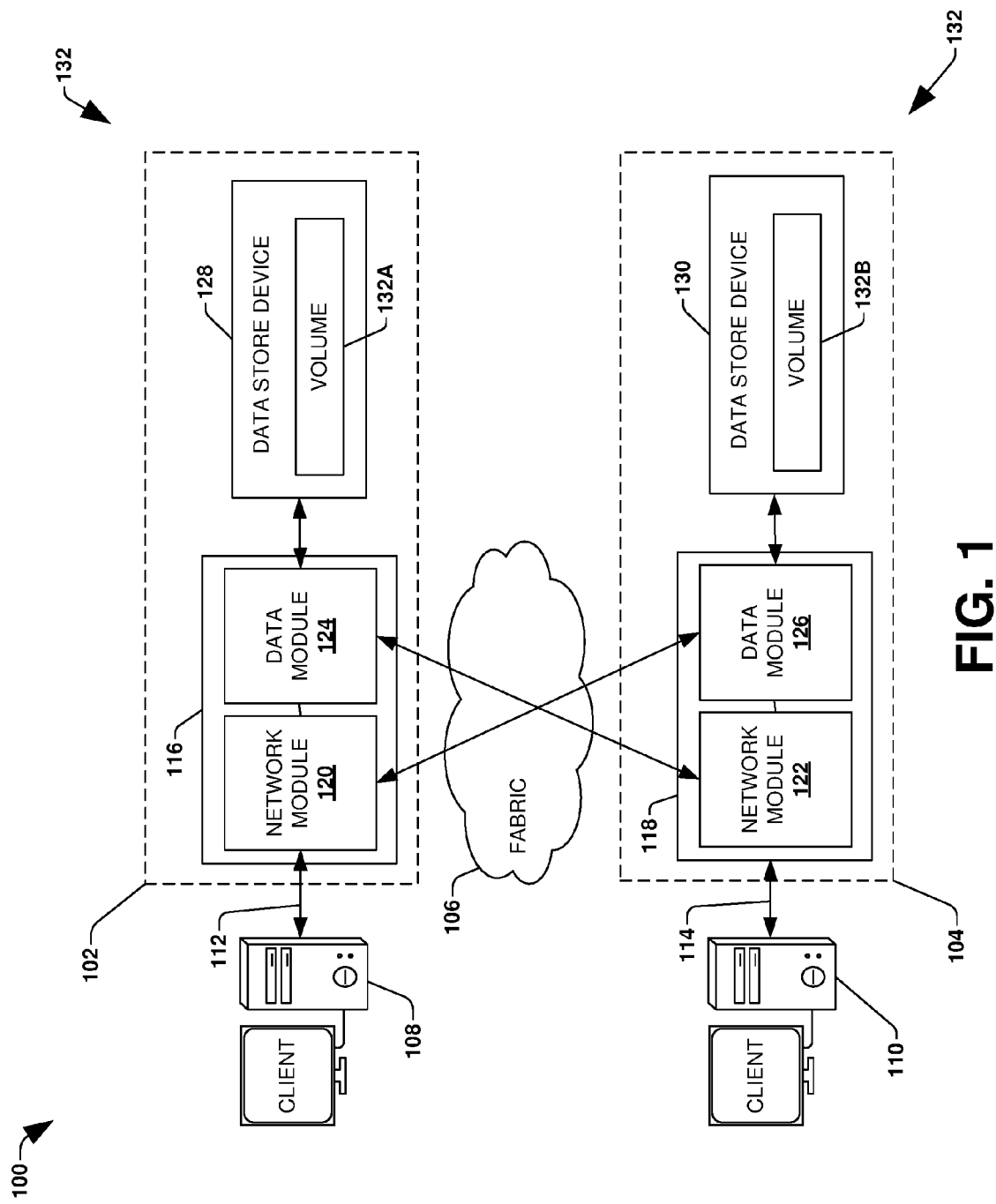
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for creating and utilizing a granset to provide a persistent on-disk layout to group and manage an arbitrary set of storage items (e.g., files and/or LUNs for which a client wants to provide synchronous replication as part of a consistency group) are provided herein. For example, one or more storage controllers may host a variety of storage items, such as files and/or LUNs, within volumes. Unfortunately, implementing storage operations at an individual storage item level of granularity may be cumbersome and/or resource intensive. Similarly, implementing storage operations at a volume level of granularity may waste resources, such as resources used to replicate all storage items within a volume where a client may desire to replicate merely a subset of the storage items within the volume.

Accordingly, as provided herein, a subset of storage items may be grouped into a consistency group so that storage operations, such as data replication, may be performed upon the consistency group. A granset is created to track, manage, and provide access to the subset of storage items within the consistency group. The granset may comprise application programming interfaces (APIs) and a persistent on-disk layout such as a metafile for tracking, managing, and providing access to the consistency group. For example, granset may comprise properties that are applied to all storage items within the consistency group, such as an access type property (e.g., a read only property, a read and write property, a no access property), a redirection property (e.g., whether a request for a storage item is satisfied using up-to-date data from an active file system or from a prior persistent point in time version of the storage item such as from a snapshot), etc. Thus, if the consistency group comprises a relatively large number of storage items, then such storage items may be easily tracked and managed (e.g., a change to the access type property will be applied to all of the storage items within the consistency group). Gransets may be used for granular data protection (e.g., synchronous replication, asynchronous replication, semi-synchronous replication, etc.), single file restore operations, single file move on demand operations (e.g., moving a set of storage items from one storage container to another), file clones, etc.

To provide context for managing an arbitrary set of storage items using a granset, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides failover access to storage devices of a disaster cluster of nodes in the event a disaster occurs at a disaster storage site comprising the disaster cluster of nodes (e.g., the first cluster of nodes provides client devices with failover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that managing an arbitrary set of storage items using a granset may be implemented within the clustered network environment 100. In an example, the granset may be used to manage a subset of storage items, such as files and/or LUNs, within the volume 132A maintained by the node 116 (e.g., a first storage controller). For example, the granset may be used to identify a consistency group of storage items to replicate to the volume 132B maintained by the node 118 (e.g., a second storage controller). It may be appreciated that managing an arbitrary set of storage items using a granset may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
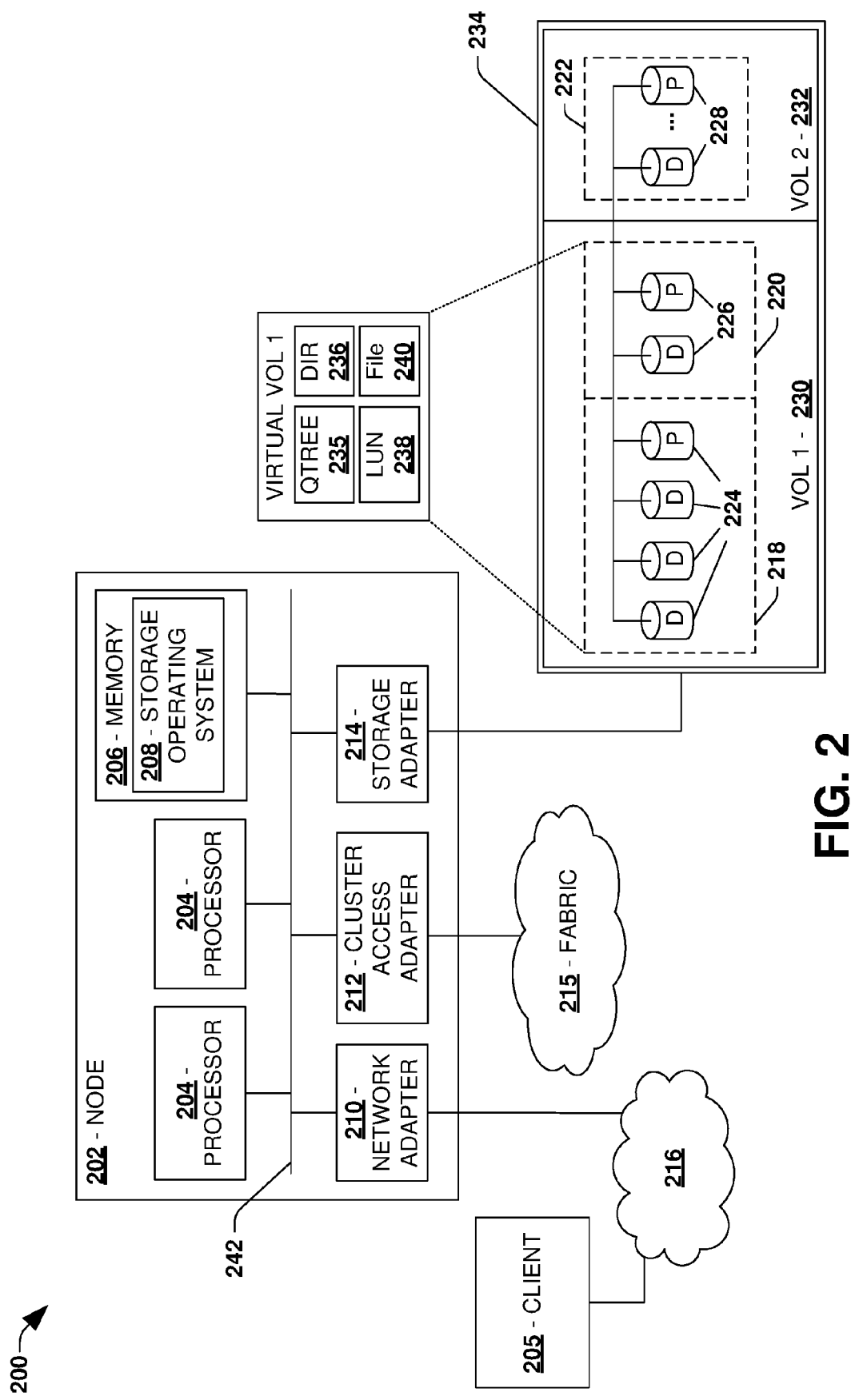
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that managing an arbitrary set of storage items using a granset may be implemented for the data storage system 200. In an example, the granset may be used to manage a subset of storage items, such as files and/or LUNs, within the volume 230 maintained by the node 202 (e.g., a first storage controller). For example, the granset may be used to identify a consistency group of storage items to replicate to a second volume maintained by a second node (e.g., a second storage controller). It may be appreciated that managing an arbitrary set of storage items using a granset may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
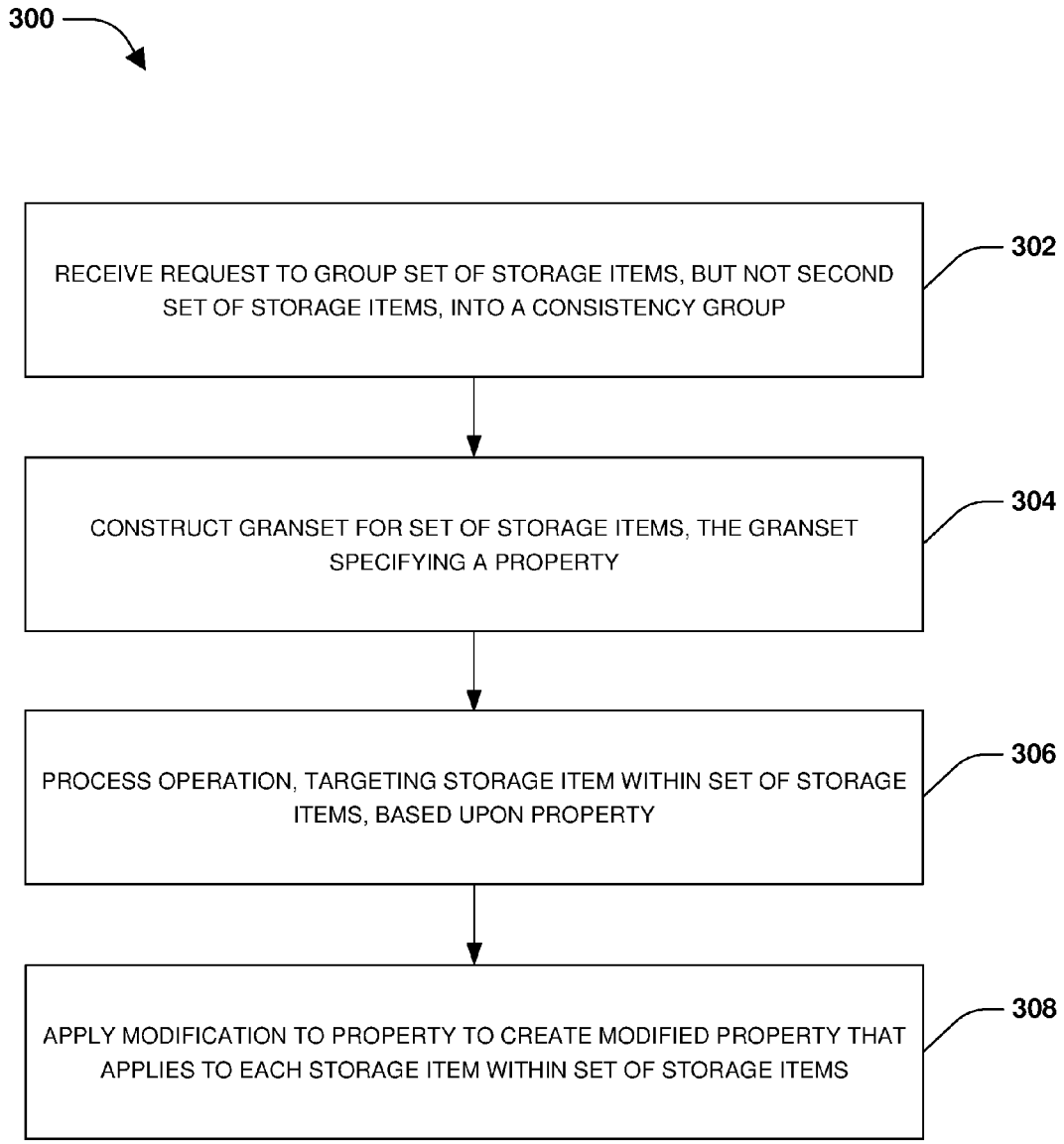
FIG. 3 is a flow chart illustrating an exemplary method of managing an arbitrary set of storage items using a granset.

One embodiment of managing an arbitrary set of storage items using a granset is illustrated by an exemplary method 300 of FIG. 3. A storage controller may host storage within which storage items, such as files, LUNs, and/or other storage objects, are stored (e.g., a client may store user data within storage items that are stored within a volume, across multiple volumes, and/or across storage of multiple storage controllers). The client may desire to group a subset of the storage items into a set of storage items so that properties may be applied to the entire set of storage items for improved storage operation efficiency and management. Accordingly, a request may be received to group a set of storage items (e.g., a file (A) within a first directory of a volume, a file (D) within a second directory of the volume, and a LUN (E) within a second volume) but not a second set of storage items (e.g., other files and/or LUNs within the volume and the second volume) into a consistency group. Because a storage operating system and/or a storage file system of the storage controller may not understand how to group an arbitrary set of storage items (e.g., files and/or LUNs) and apply uniform properties to such a group (e.g., properties that govern access control such as read only access, read-write access, no access, redirection to a snapshot, etc.), there is a need for a persistent file system infrastructure (e.g., a persistent on-disk layout) and application programming interfaces (APIs) (e.g., APIs that can provide atomic CRUD operations) for grouping storage items into the consistency group so that uniform properties may be applied to the consistency group. Accordingly, a granset may be constructed for grouping and applying uniform properties to the storage items. The storage items may be stored within a volume, within different directories of the volume, across multiple volumes, and/or across multiple storage controllers.

At 304, a granset for the set of storage items may be constructed (e.g., atomically created such that a granset create operation either completely succeeds or completely fails as though never attempted). For example, the granset may comprise a persistent on-disk layout, such as a metafile or other data structure, used to identify storage items within the consistency group and mange properties for the storage items (e.g., properties specifying access rights to storage items within the consistency group). The granset may comprise APIs used to manage the storage items (e.g., APIs to add items to or remove items from the consistency group; APIs to specify whether storage items within the consistency group are read only, are readable and writeable, or are inaccessible; APIs to specify whether a request for a storage item is processed using up-to-date data from an active file system or persistent point in time data from a snapshot; etc.). In an example, the granset may be stored within a granset metafile used to store a plurality of gransets (e.g., up to 255 or any other number of gransets) sequentially laid out within the granset metafile at fixed indices (e.g., an offset may be used to quickly identify a target granset for access). It may be appreciated that the granset may be stored in any type of data structure having any type of layout (e.g., a B+ tree layout with data indexed by granset ID and where a payload of a B+ tree entry would have granset items and properties). The granset metafile may comprise granset property blocks within which properties of gransets are stored (e.g., access type properties, redirection properties, fencing properties, state properties, etc.) and/or storage item blocks corresponding to (e.g., identifying) storage items within consistency groups. A hash table mapping may be maintained to map unique identifiers of storage items within the consistency group to a granset identifier of the granset. The granset identifier may be stored within inodes of the storage items. In this way, the inodes, the granset, the hash table mapping, and/or the granset identifier may be used to tracking what storage items are within the consistency group.

The granset may comprise properties that are applied to each storage item within the set of storage items, which may be efficient because thousands of storage items may be grouped into the consistency group. In an example, the granset may comprise an access type property for the set of storage items. The access type property may specifying whether clients have read only access, read and write access, or no access to the set of storage items within the consistency group. In another example, the granset may comprise a redirection property specifying whether operations targeting storage items within the consistency group are to be processed with data from an active file system or data from a prior persistent point in time representation of the storage items such as a snapshot (e.g., operations may be directed to the snapshot during a resynchronization phase for resynchronizing the set of storage items with a set of mirrored storage items maintained by a second storage controller as replicated copies of the set of storage items). In another example, the granset may comprise a fencing property specifying whether read operations, write operations, rename operation, delete operations, or other operations to storage items within the consistency group are to be fenced from being implemented (e.g., rename and delete operations may be denied during active synchronous replication). In another example, the granset provides a way for a particular use case (e.g., synchronous replication, asynchronous replication, semi-synchronous replication, single file restore, single file move on demand, file clones, etc.) to store a state. For example, a state for synchronous replication may specify whether a mirroring relationship is in-sync or out of sync.

The granset may be associated with various APIs for managing the storage items within the consistency group. In an example, a request to add a storage item to the set of storage items of the consistency group may be received. The granset may be updated to include, such as to identify, the storage item. An inode of the storage item may be modified to comprise the granset identifier of the granset used to identify the consistency group. If a second storage controller hosts a mirrored storage item that is a replicated copy of the storage item, then a second granset, maintained by the second storage controller, may be updated to include the mirrored storage item. In an example, updating the granset and the second granset may have a disruptive impact on the mirroring relationship, and thus the update to the second granset may not be replicated via a normal update operation. An inode of the mirrored storage item may be updated with the granset identifier. A synchronization between the storage item and the mirrored storage item may be performed.

In another example, a request to delete a storage item from the set of storage items of the consistency group may be received. The granset may be updated to exclude the storage item as being in the consistency group. An inode of the storage item may be modified to remove the granset identifier of the granset used to identify the consistency group. If a second storage controller hosts a mirrored storage item that is a replicated copy of the storage item, then a second granset, maintained by the second storage controller, may be updated to exclude the mirrored storage item. In an example, updating the granset and the second granset may have a disruptive impact on the mirroring relationship, and thus the update to the second granset may not be replicated via a normal update operation. An inode of the mirrored storage item may be updated to remove the granset identifier. When the storage item is removed from the granset, subsequent operations to the storage item are not processed by granset access enforcement logic.

Storage items within the consistency group may be managed based upon the properties of the granset. In an example, the granset may be utilized to enumerate the storage items, within the set of storage items, as being assigned to the consistency group. In another example, access to the storage items may be facilitated based upon the property within the granset. For example, an operation, targeting a storage item within the set of storage items, may be processed based upon a property within the granset, at 306. In an example, if the access type property is set to read only and the operation is a write operation, then the write operation may be denied. In another example, if the redirection property is set to a snapshot ID and the operation is a read operation, then the read operation may be processed using data within a snapshot, identified by the snapshot ID, as opposed to data within an active file system.

At 308, a modification to a property of the granset may be received. For example, a property modify command may be received to change the access type property from read only to read and write access. Accordingly, the property may be modified to create a modified property that applies to each storage item within the set of storage items.

In an example, an upper layer can utilize the granset to implement a use-case specific enforcement. For example, the granset provides fencing based on an agreed-upon monotonically increasing generation number. One example is when granset allows all operations tagged with the agreed-upon generation number and another example is where granset rejects all operation tagged with the agreed-upon generation number and only allows operations that are not tagged.

In an example, the granset may be utilized to perform an item move on demand operation to move a group of storage items within the consistency group from a first volume to a second volume. In another example, the granset may be utilized to perform an item restore upon the group of storage items within the consistency group. The granset may be used to issue a group I/O fence to fence I/O to the group of storage items being operated upon by the item move on demand operation or by the item restore, as opposed to a doing I/O fencing per storage item for each storage item within the group of storage items. In this way, the granset may be used to track, manage, and/or facilitate access to storage items grouped into the consistency group.

Figure 4A:
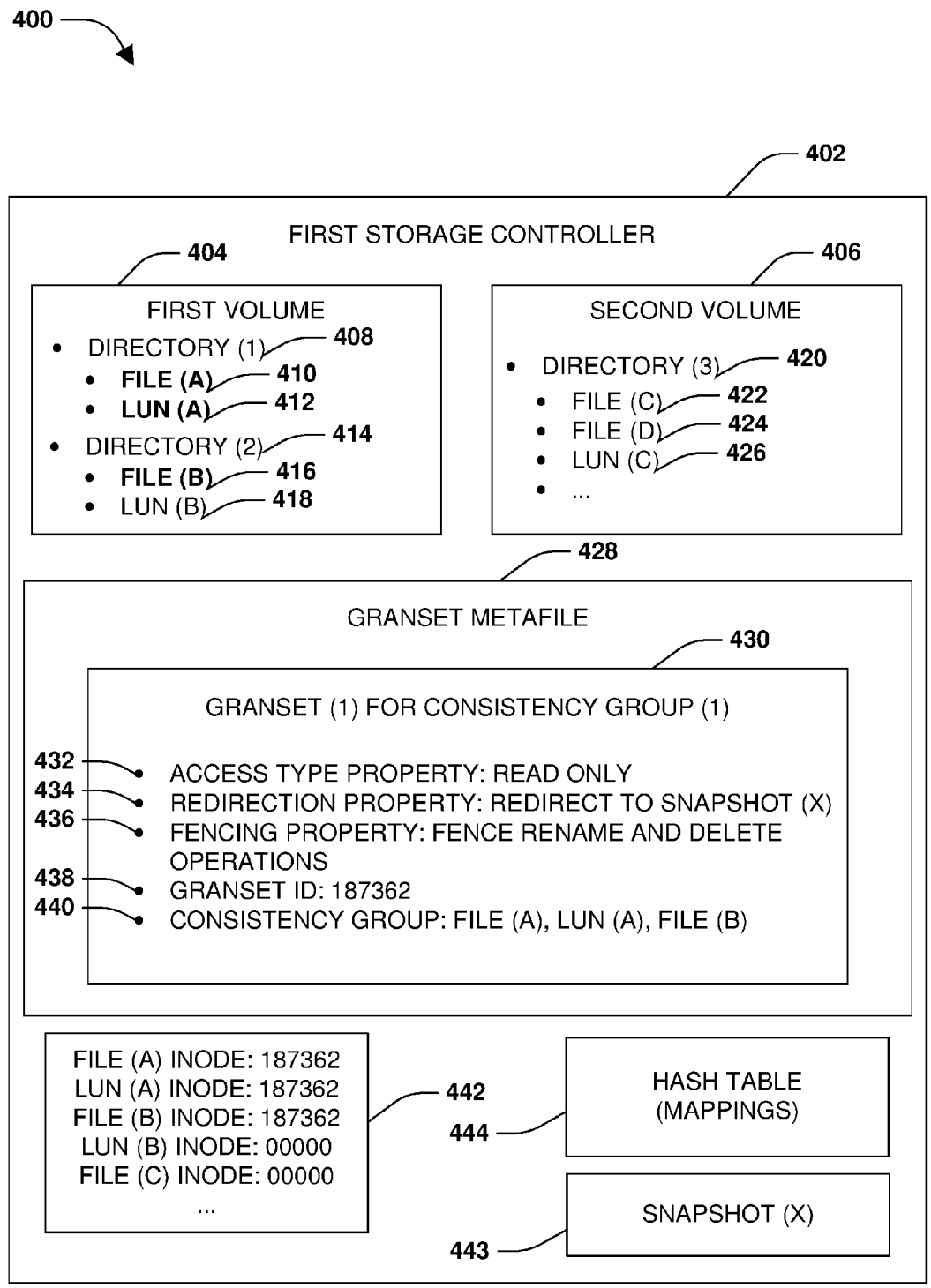
FIG. 4A is a component block diagram illustrating an exemplary computing device for managing an arbitrary set of storage items using a granset, where the granset is constructed for a consistency group.

FIGS. 4A-4G illustrate examples of a system 400 for managing an arbitrary set of storage items using a granset. For example, a first storage controller 402 may host a first volume 404 comprising a first directory 408, a second directory 414, and/or other directories, as illustrated by FIG. 4A. The first storage controller 402 may host a second volume 406 comprising a third directory 420 and/or other directories. A client may desire to group one or more storage items within the first volume 404, the second volume 406, and/or other volumes such as a third volume hosted by a second storage controller. For example, a file (A) 410 and a LUN (A) 412 within the first directory 408 and a file (B) 416 within the second directory 414, but not a LUN (B) 418 within the second directory 414 and/or other storage items, may be grouped into a first consistency group.

A first granset 430 may be created to group and provide controlled access to storage items within the first consistency group. The first granset 430 may be stored within a granset metafile 428 used to store a plurality of gransets for consistency groups. A granset identifier 438 of 187362 may be assigned to and/or stored within the first granset 430. The granset identifier 438 may be stored within inodes 442 of storage items within the first consistency group, such as a file (A) inode of the file (A) 410, a LUN (A) inode of the LUN (A) 412, and a file (B) inode of the file (B) 416. Identifiers within inodes of storage items not within the first consistency group may be zeroed out or set to a different value. A hash table 444 may be used to map unique identifiers of the file (A) 410, the LUN (A) 412, the file (B) 416 and/or other storage items within the first consistency group to the granset identifier 438. The first granset 430 may comprise a consistency group identifier 440 that identifies the file (A) 410, the LUN (A) 412, the file (B) 416 and/or other storage items as being within the first consistency group.

The first granset 430 may comprise properties that are applied to each storage item within the first consistency group. For example, an access type property 432 may specify that clients have read only access to the file (A) 410, the LUN (A) 412, the file (B) 416, and/or other storage items within the first consistency group. A redirection property 434 may specify that access operations to the file (A) 410, the LUN (A) 412, the file (B) 416, and/or other storage items within the first consistency group are to be redirected to a snapshot (X) 443, and thus data of the snapshot (X) 443 will be used to process such access operations in place of data within an active file system. A fencing property 436 may specify that rename operations and delete operations are to be fenced (e.g., blocked) from being implemented upon the file (A) 410, the LUN (A) 412, the file (B) 416, and/or other storage items within the first consistency group.

Figure 4B:
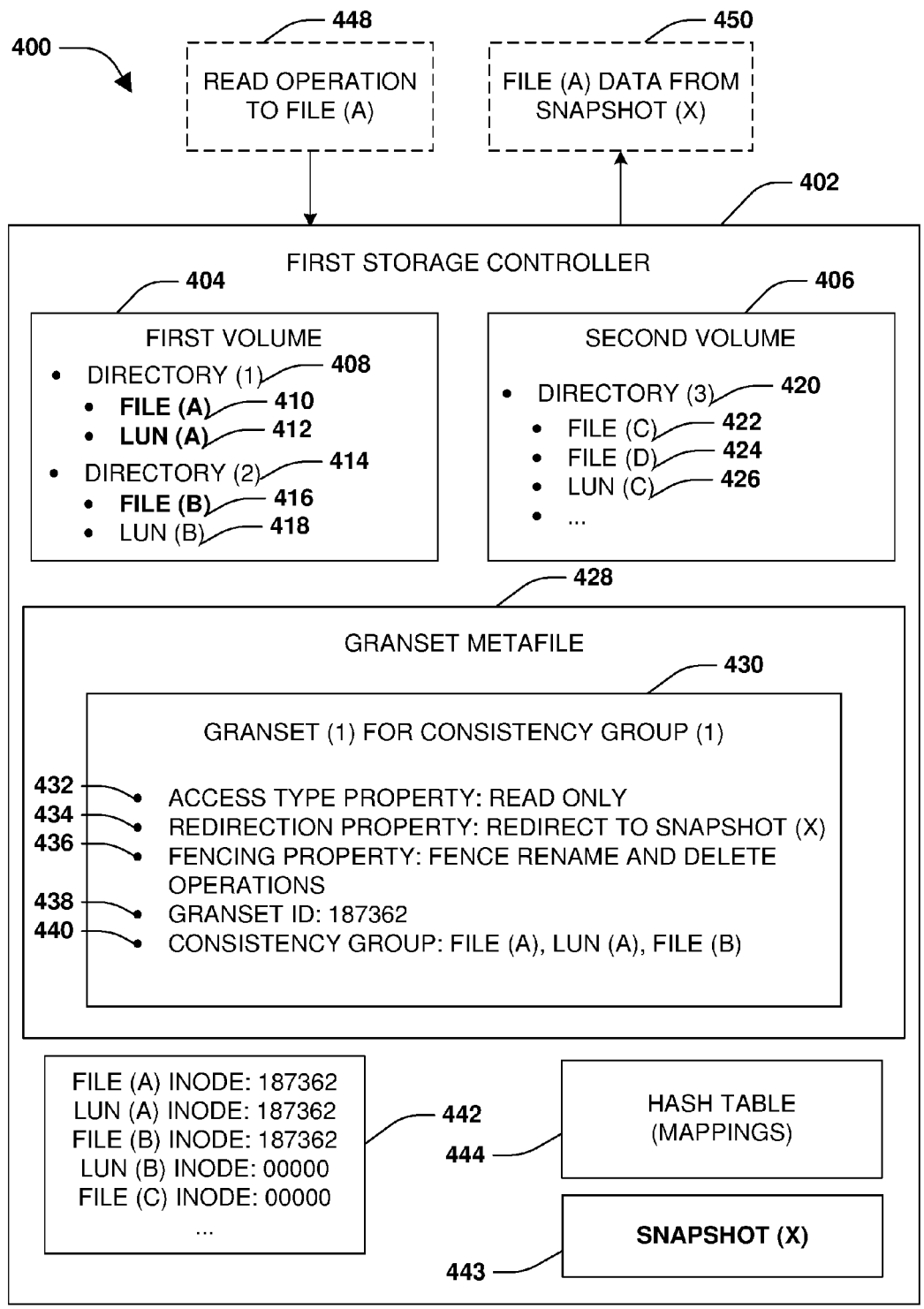
FIG. 4B is a component block diagram illustrating an exemplary computing device for managing an arbitrary set of storage items using a granset, where a read operation is allowed to be processed using snapshot data.

FIG. 4B illustrates a read operation 448, targeting the file (A) 410, being received by the first storage controller 402. In an example, the granset identifier 438 within the file (A) inode may indicate that the first granset 430 applies to the file (A) 410 as being within the first consistency group. In another example, a unique identifier of the file (A) 410 may be used as a lookup into the hash table 444 to determine that the first granset 430 applies to the file (A) 410 as being within the first consistency group. Thus, the first granset 430 may be used to process access requests to the file (A) 410. For example, the access type property 432 may specify that the read operation 448 is allowed. Accordingly, file (A) data 450 may be provided from the snapshot (X) 443 based upon the redirection property 434.

Figure 4C:
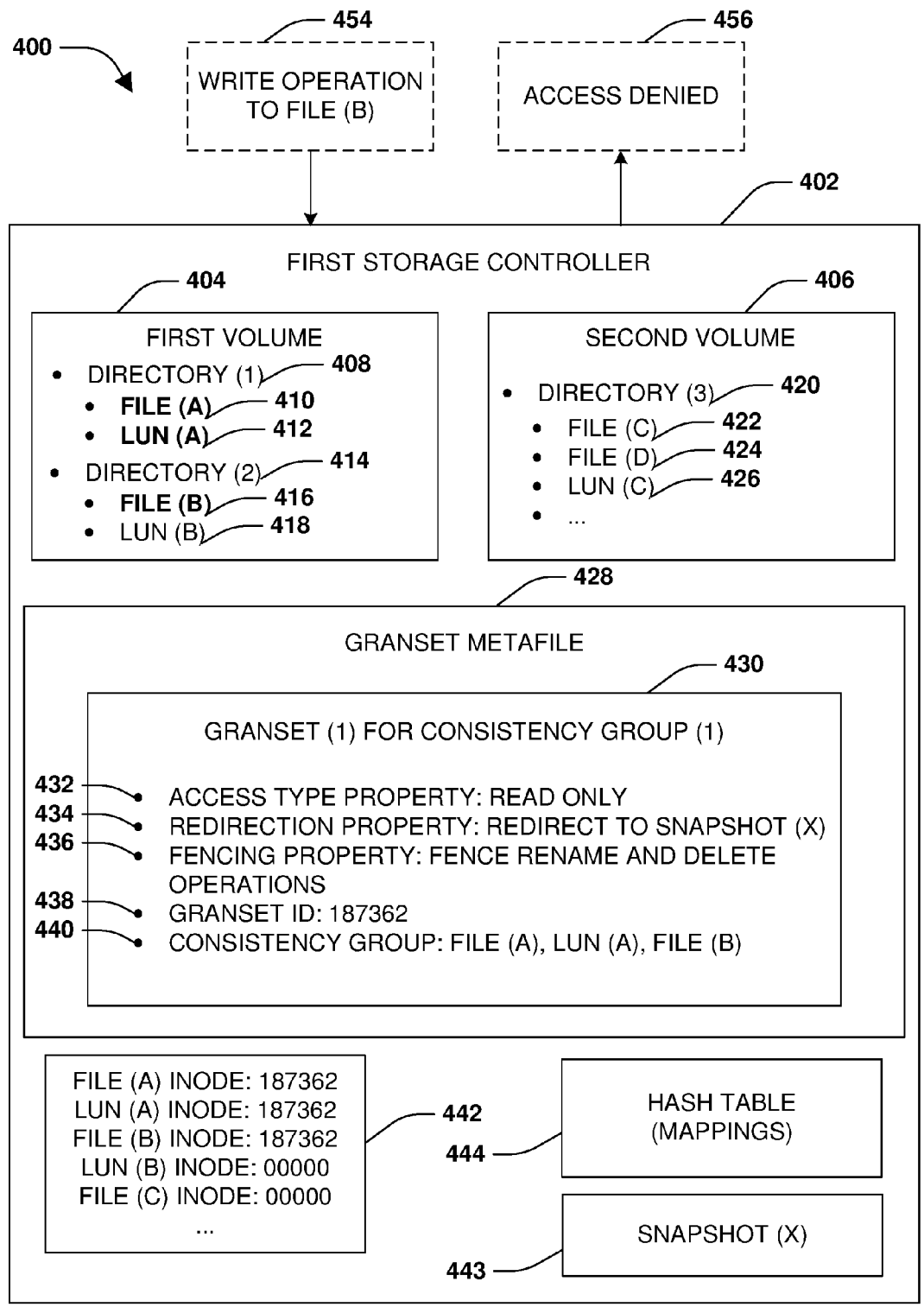
FIG. 4C is a component block diagram illustrating an exemplary computing device for managing an arbitrary set of storage items using a granset, where a write operation is denied.

FIG. 4C illustrates a write operation 454, targeting the file (B) 416, being received by the first storage controller 402. The file (B) 416 may be identified as being part of the first consistency group (e.g., based upon the file (B) inode comprising the granset identifier 438, the hash table 444 mapping the file (B) 416 to the granset identifier 438, and/or the consistency group identifier 440 identifying the file (B) 416 as being within the first consistency group) and thus the first granset 403 is used to process requests to the file (B) 416. Because the access type property 432 specifies that read only access is provided for the file (B) 416, the write operation 454 may be denied 456.

Figure 4D:
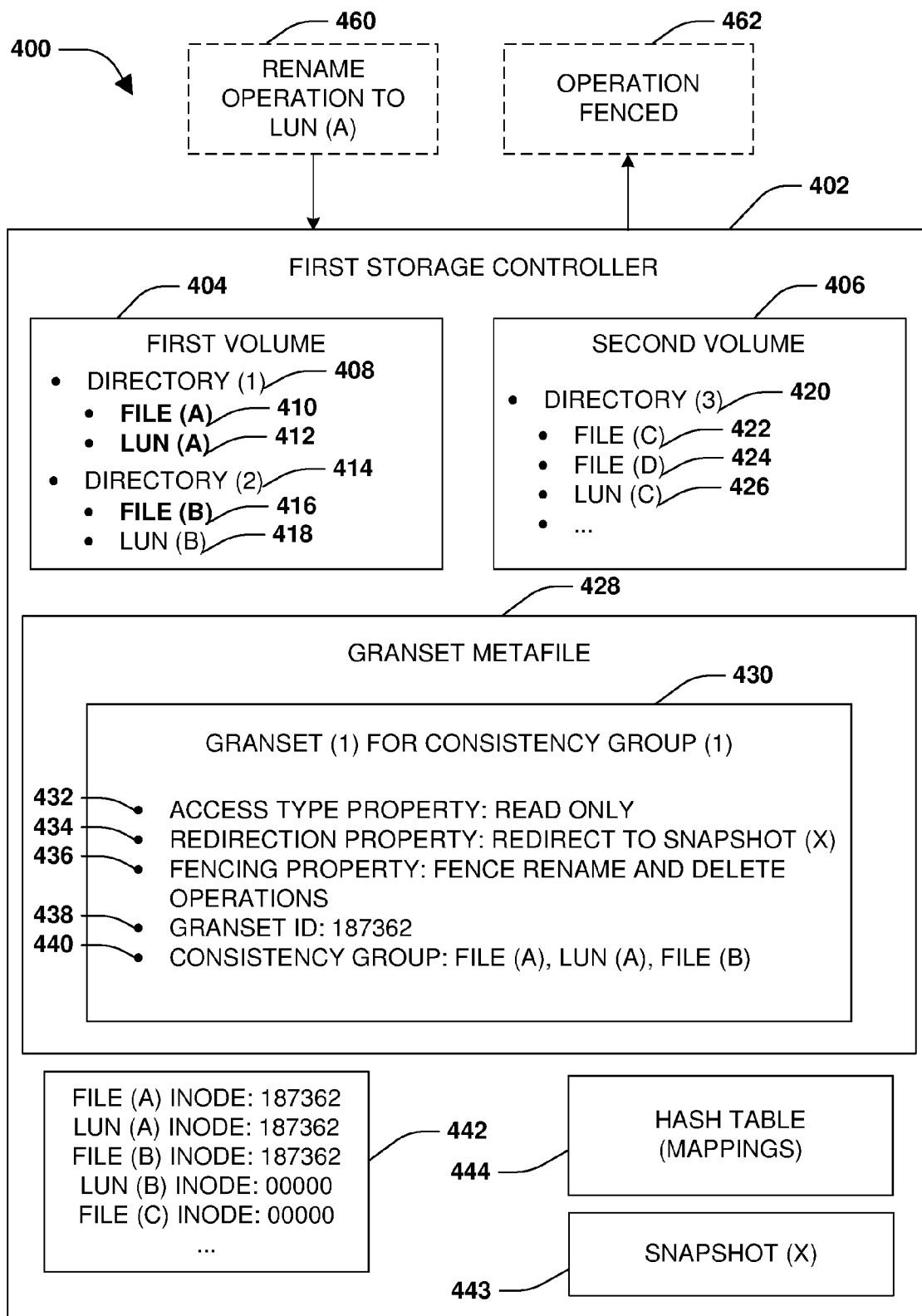
FIG. 4D is a component block diagram illustrating an exemplary computing device for managing an arbitrary set of storage items using a granset, where a rename operation is fenced.

FIG. 4D illustrates a rename operation 460, targeting the LUN (A) 412, being received by the first storage controller 402. The LUN (A) 412 may be identified as being part of the first consistency group (e.g., based upon the LUN (A) inode comprising the granset identifier 438, the hash table 444 mapping the LUN (A) 412 to the granset identifier 438, and/or the consistency group identifier 440 identifying the LUN (A) 412 as being within the first consistency group) and thus the first granset 430 is used to process access to the LUN (A) 412. Because the fencing property 436 specifies that rename operations are to be fenced, the rename operation 460 may be fenced 462 and thus blocked from being implemented upon the LUN (A) 412.

Figure 4E:
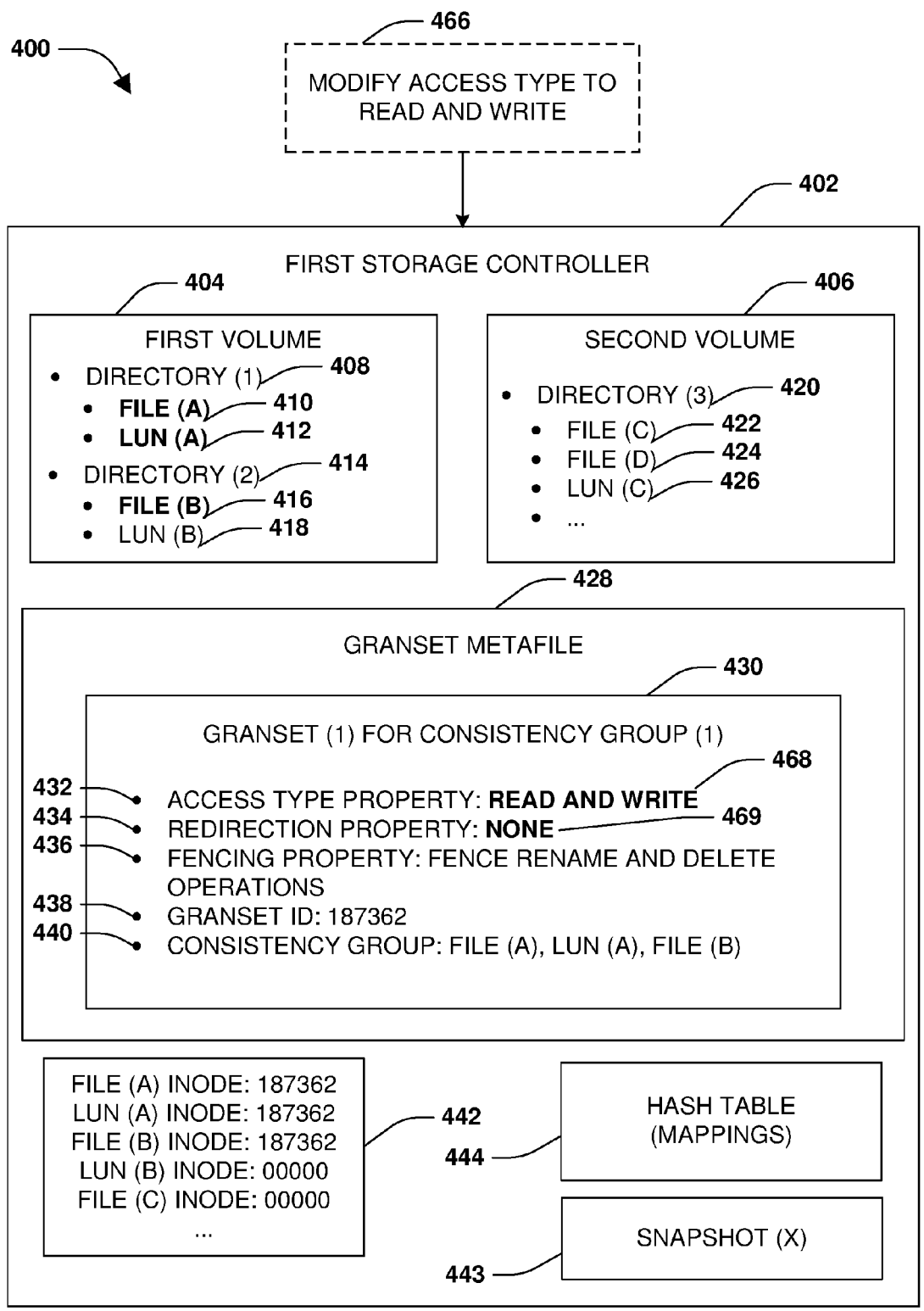
FIG. 4E is a component block diagram illustrating an exemplary computing device for managing an arbitrary set of storage items using a granset, where an access type property of the granset is modified.

FIG. 4E illustrates a modify property command 466 being received by the first storage controller 402. The modify property command 466 may target the access type property 432 within the first granset 430. Accordingly, the modify property command 466 may be implemented to modify 468 the access type property 432 from a read only access type to a read and write access type. A modification to a granset property can be serialized with other access operations that are directed to individual storage items of the first granset 430. For example, a first write operation, issued prior to the modify property command 466, may be fenced, whereas a second write operation, issued after the modify property command 466, will succeed. In an example, the redirection property 434 may be set or cleared 469 to none (e.g., at the time that the access type property 432 is changed to read and write access), such that access operations to the first consistency group are processed using active file system data (e.g., instead of from the snapshot (X) 443).

Figure 4F:
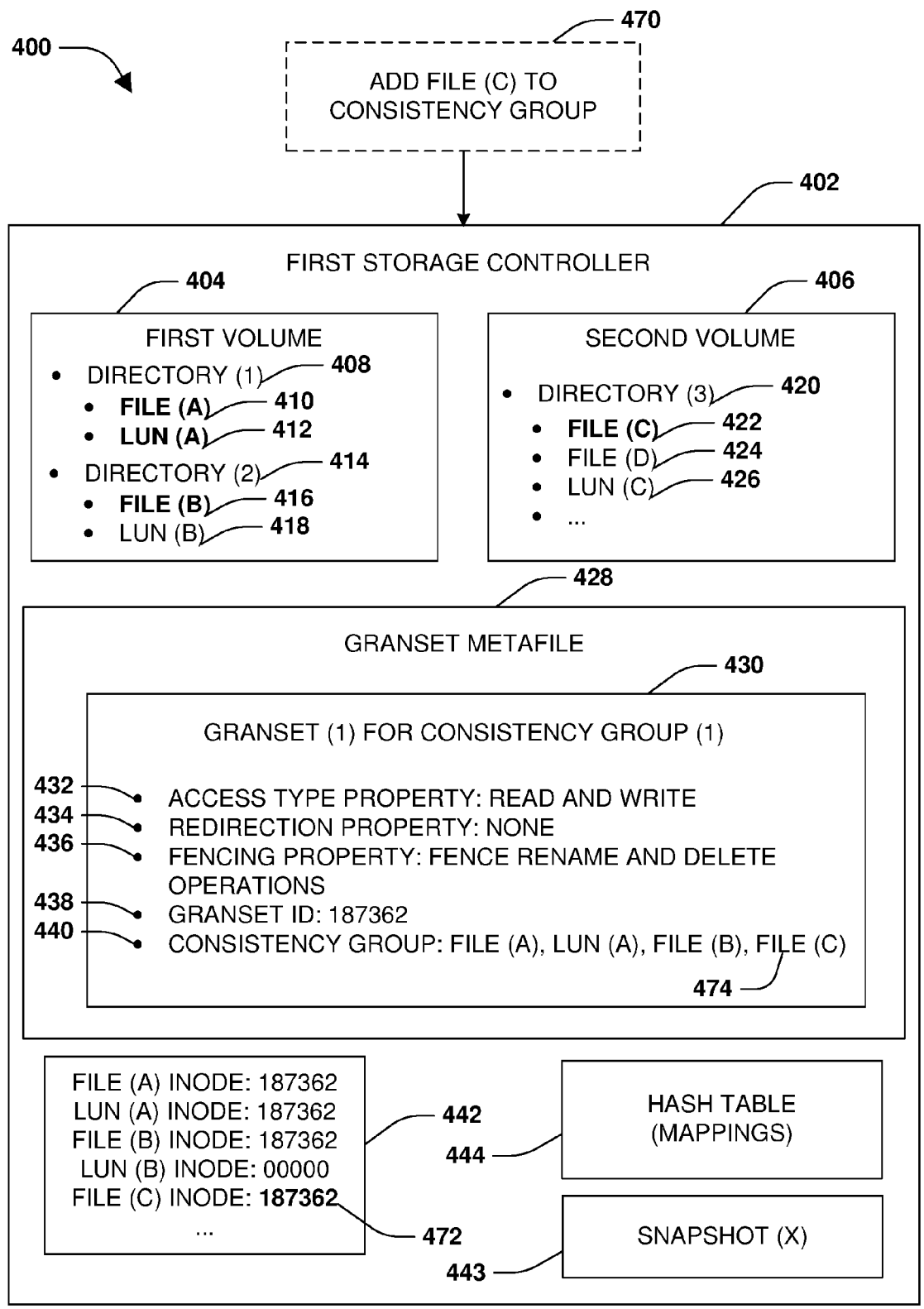
FIG. 4F is a component block diagram illustrating an exemplary computing device for managing an arbitrary set of storage items using a granset, where a file is added to a consistency group.

FIG. 4F illustrates an add to consistency group command 470 being received by the first storage controller 402. The add to consistency group command 470 may specify that the file (C) 422, within the third directory 420 of the second volume 406, is to be add into the consistency group so that the properties of the first granset 430 will now also apply to the file (C) 422. Accordingly, an identifier 474 of the file (C) 422 may be added into the consistency group identifier 440 of the first granset 430. The file (C) inode may be updated 472 with the granset identifier 438. The hash table 444 may be updated with a mapping between the identifier 474 of the file (C) 422 and the granset identifier 438. Add and delete commands for the first granset 430 can be serialized with other access operations that are in-flight on storage items within the first granset 430.

Figure 4G:
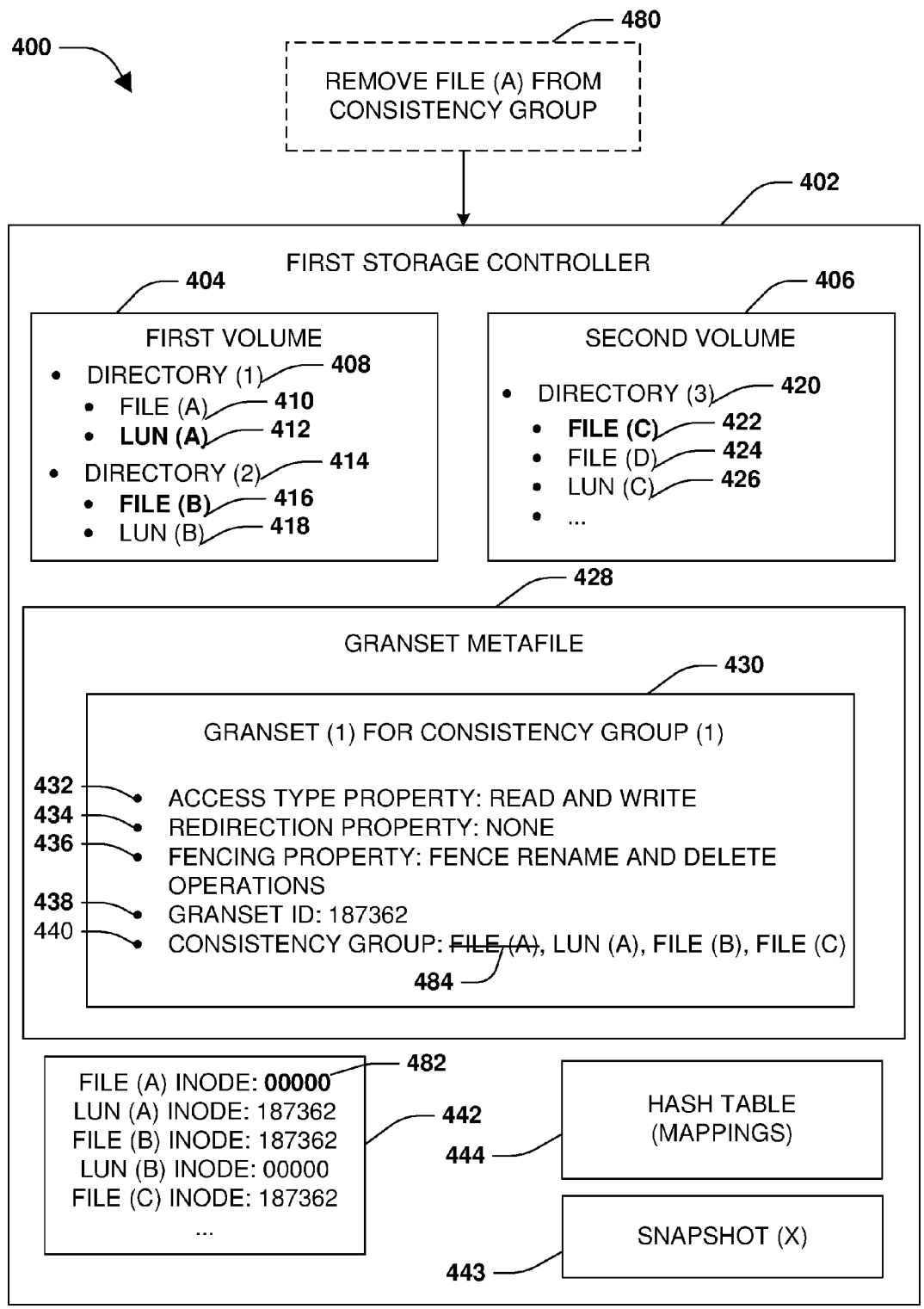
FIG. 4G is a component block diagram illustrating an exemplary computing device for managing an arbitrary set of storage items using a granset, where a file is removed from a consistency group.

FIG. 4G illustrates a remove from consistency group command 480 being received by the first storage controller 402. The remove from consistency group command 480 may specify that the file (A) 410, of the first directory 408 of the first volume 404, is to be removed from the consistency group so that the properties of the first granset 430, such as access restrictions based upon the access type property 432, the redirection property 434, etc., will no longer apply to the file (A) 410. Accordingly, an identifier 484 of the file (A) 410 may be removed from the consistency group identifier 440 of the first granset 420. The file (A) inode may be updated 482 to not comprise the granset identifier 438 (e.g., zeroed out or set to any other value). The hash table 444 may be updated to remove a mapping between the identifier 484 of the file (A) 410 and the granset identifier 438.

Figure 4H:
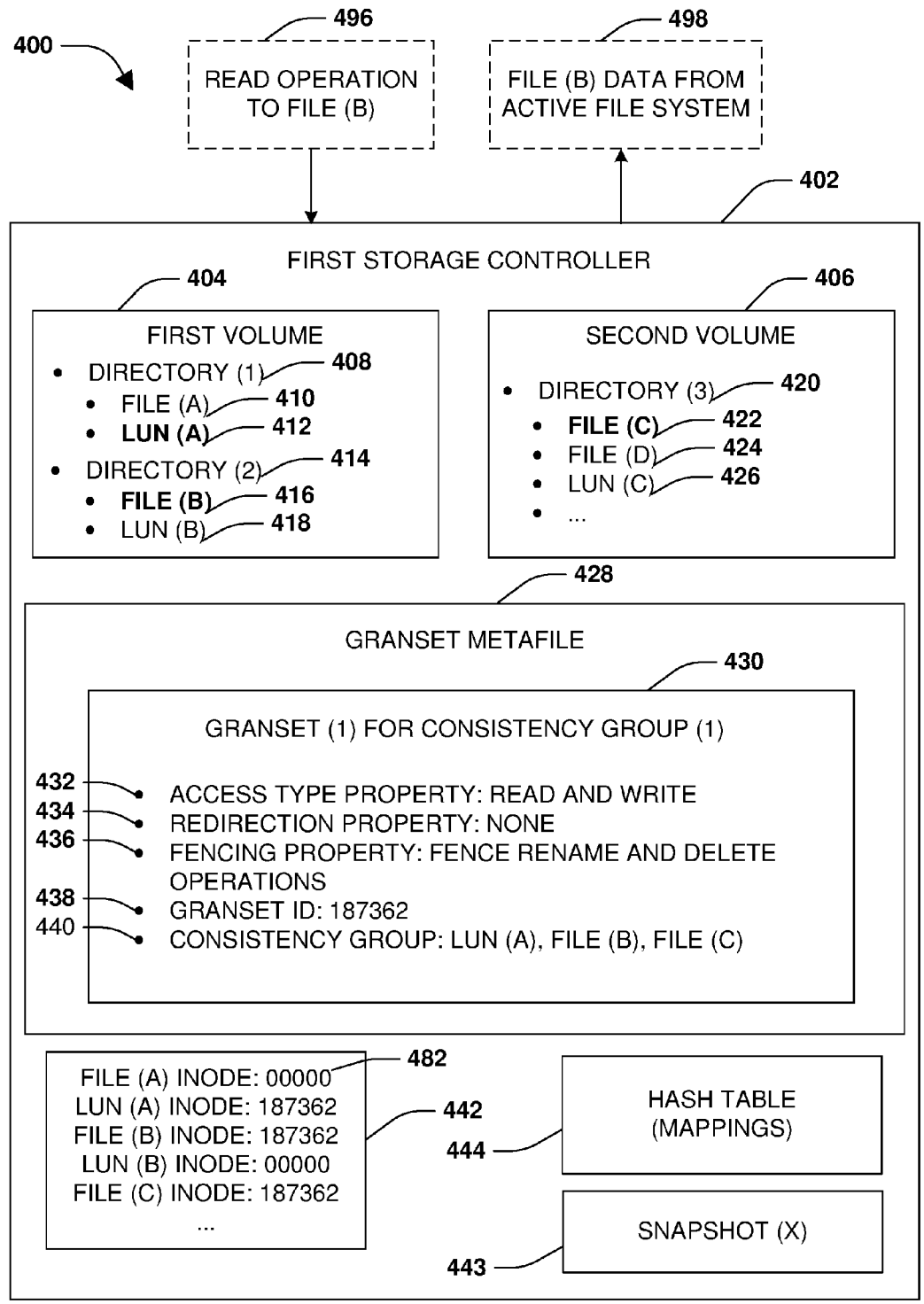
FIG. 4H is a component block diagram illustrating an exemplary computing device for managing an arbitrary set of storage items using a granset, where a read operation is allowed to be processed using active file system data.

FIG. 4H illustrates a read operation 496, targeting the file (B) 416, being received by the first storage controller 402. In an example, the granset identifier 438 within the file (B) inode may indicate that the first granset 430 applies to the file (B) 416 as being within the first consistency group. In another example, a unique identifier of the file (B) 416 may be used as a lookup into the hash table 444 to determine that the first granset 430 applies to the file (B) 416 as being within the first consistency group. Thus, the first granset 430 may be used to process access requests to the file (B) 416. For example, the access type property 432 may specify that the read operation 498 is allowed. Accordingly, file (B) data 498 may be provided from the active file system based upon the redirection property 434.

Figure 5:
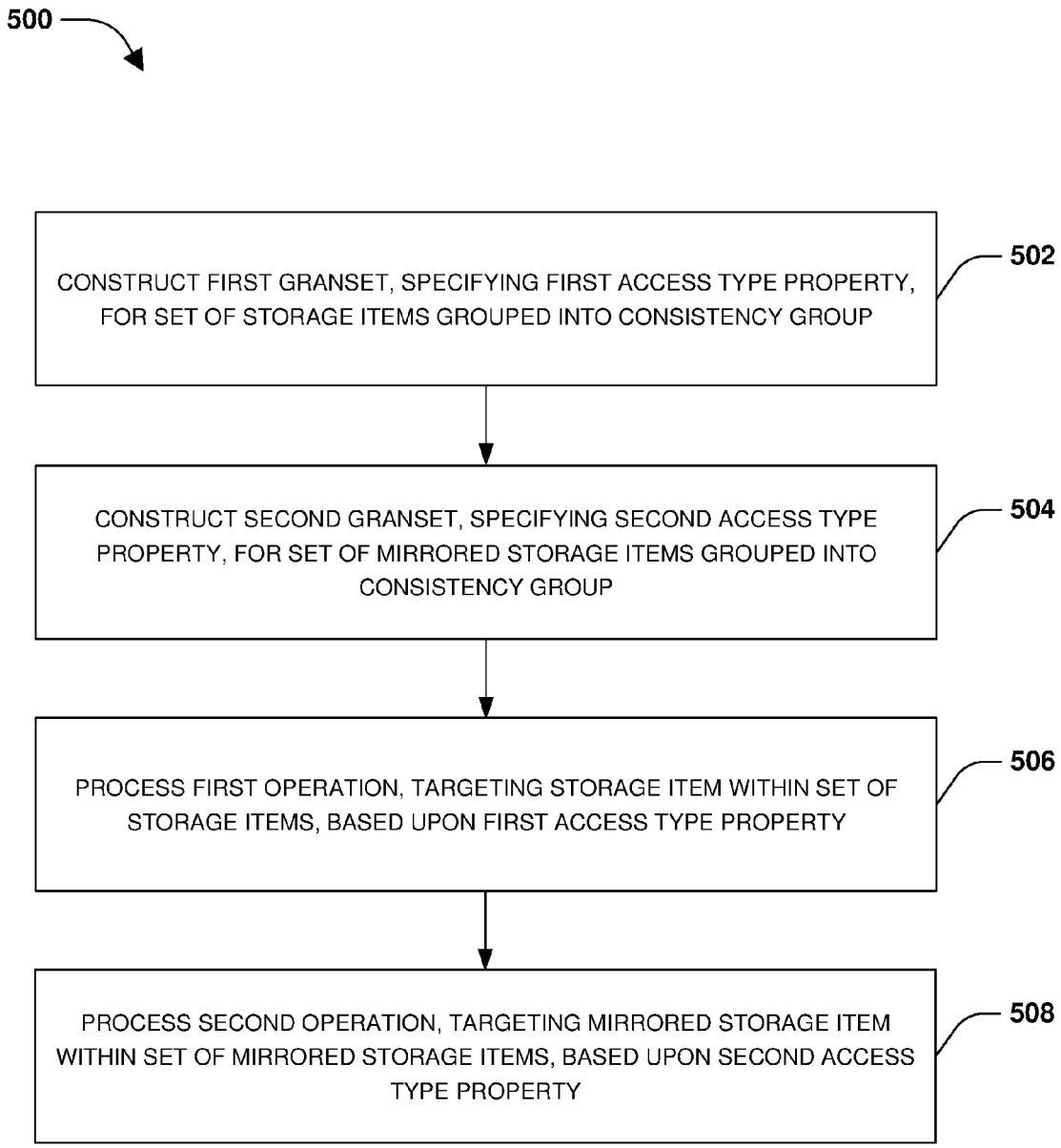
FIG. 5 is a flow chart illustrating an exemplary method of managing an arbitrary set of storage items using a granset.

One embodiment of managing an arbitrary set of storage items using a granset is illustrated by an exemplary method 500 of FIG. 5. A first storage controller may host storage within which storage items, such as files, LUNs, and/or other storage objects, are stored (e.g., a client may store user data within storage items that are stored within a volume, across multiple volumes, and/or across storage of multiple storage controllers). The client may desire to group a subset of the storage items into a set of storage items so that properties may be applied to the entire set of storage items for storage operation efficiency and collective data management. For example, the client may desire to provide data protection for the set of storage items, but not other storage items maintained by the first storage controller. Accordingly, the set of storage items may be grouped into a consistency group that is replicated, such as synchronous replicated, from the first storage controller to a second storage controller as a set of mirrored storage items within second storage hosted by the second storage controller. In this way, if the first storage controller fails, then a failover operation may be performed to failover from the first storage controller to the second storage controller so that the second storage controller can provide clients with failover access to replicated data within the set of mirrored storage items in place of the set of storage items previously accessible through the first storage controller before the failure.

At 502, a first granset may be constructed for the set of storage items that are grouped into the consistency group hosted by the first storage controller. The first granset may provide properties and/or APIs used to track, manage, and/or provide access to the set of storage items. For example, the first granset may comprise a first access type property for the set of storage items (e.g., read and write access may be provided to the set of storage items). At 504, a second granset may be constructed for the set of mirrored storage items grouped into the consistency group hosted by the second storage controller. The second granset may provide properties and/or APIs used to track, manage, and/or provide access to the set of mirrored storage items. For example, the second granset may comprise a second access type property for the set of mirrored storage items (e.g., read only access may be provided to the set of mirrored storage items because the set of mirrored storage items are maintained as a backup of the set of storage items).

At 506, responsive to receiving a first operation targeting a storage item within the set of storage items, the first operation may be processed based upon the first access type property (e.g., read and write operations may be allowed based upon the first access type property). At 508, responsive to receiving a second operation targeting a mirrored storage item within the set of mirrored storage items, the second operation may be processed based upon the second access type property (e.g., read operations may be allowed and write operations may be denied based upon the second access type property).

In an example, gransets may be used for synchronous replication, semi-synchronous replication, and/or asynchronous replication. In this way, a granset may be used to group and manage a dispersed set of storage items that have a replication relationship (e.g., synchronous replication, asynchronous replication, and/or semi-synchronous replication), such that I/O may be fenced (e.g., to provide read and write access, read only access, no access, etc.), operation level access control may be provided (e.g., rename and delete operations may not be allowed but a get attribute operation may be allowed), and/or accessibility to data may be provided through an active file system or redirected to a snapshot. Gransets may be utilized for granular data protection, single file restore operations, single file move on demand operations (e.g., moving a set of storage items from one storage container to another), file clones, etc.

Figure 6A:
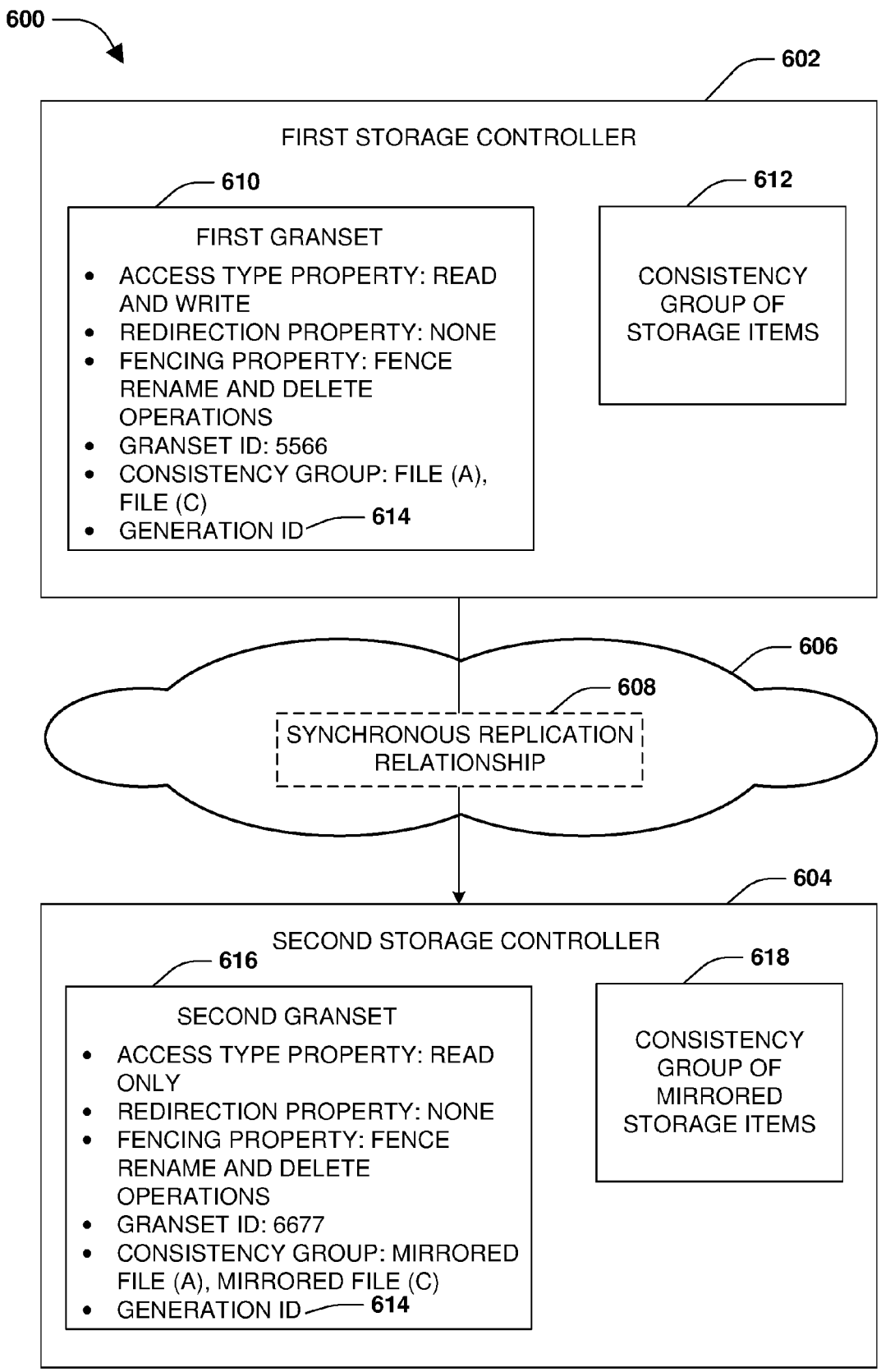
FIG. 6A is a component block diagram illustrating an exemplary computing device for managing an arbitrary set of storage items using a granset, where a first granset and a second granset are constructed.
Figure 6B:
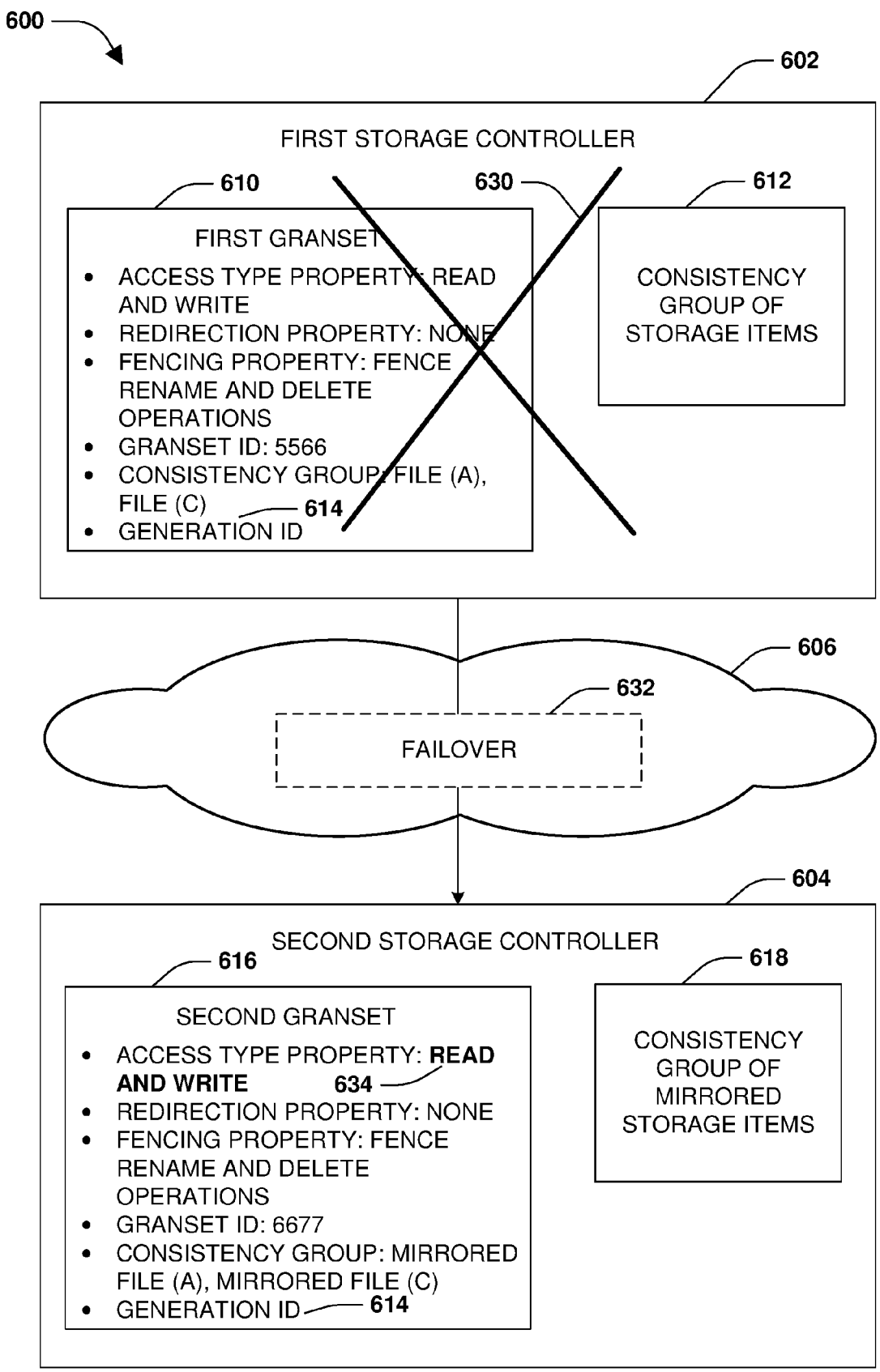
FIG. 6B is a component block diagram illustrating an exemplary computing device for managing an arbitrary set of storage items using a granset, where a failover is implemented based upon a first storage controller failing.
Figure 6C:
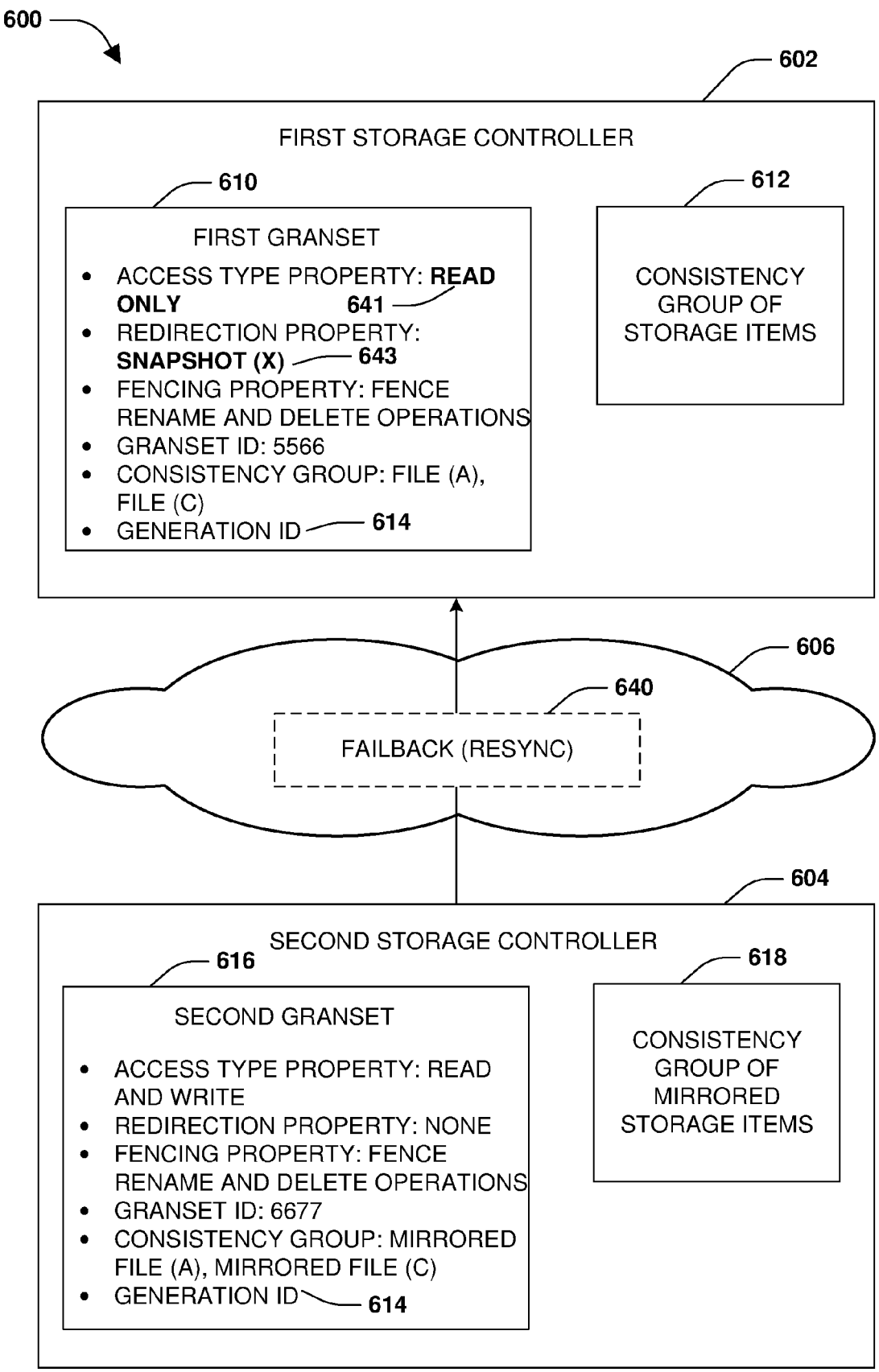
FIG. 6C is a component block diagram illustrating an exemplary computing device for managing an arbitrary set of storage items using a granset, where a failback operation is performed based upon a first storage controller recovering from a failure.

FIGS. 6A-6C illustrate examples of a system 600 for managing an arbitrary set of storage items using a granset. FIG. 6A illustrates a first storage controller 602 hosting storage items, such as files and/or LUNs. The first storage controller 602 may be capable of communicating with a second storage controller 604 over a network 606. A synchronous replication relationship 608 may be specified between the first storage controller 602 and the second storage controller 604, such that storage items may be synchronously replicated (e.g., a storage operation may be both locally implemented upon a storage item, hosted by the first storage controller 602, and remotely implemented upon a mirrored storage item, hosted by the second storage controller 604, that is maintained as a replicated backup of the storage item before an acknowledgement is provided back to a client). A subset of the storage items hosted by the first storage controller 602 may be grouped into a set of storage items 612 as a consistency group. Data protection, such as synchronous replication from the first storage controller 602 to a second storage controller 604, may be provided for the consistency group but not for other storage items hosted by the first storage controller 602 (e.g., granular synchronous replication may be provided at a storage item granularity for storage items grouped into consistency groups). In this way, the second storage controller 604 may maintain a set of mirrored storage items 618 of the consistency group. A mirrored storage item is maintained as a synchronously replicated backup copy of a storage item hosted by the first storage controller 602.

A first granset 610 may be constructed to track, manage, and/or provide access to the set of storage items 612 within the consistency group. The first granset 610 may comprise an access type property providing read and write access to the set of storage items 612, a redirection property allowing direct access to storage items within an active file system, a fencing property that fences rename and delete operations to the set of storage items, a snapshot ID for redirection, a granset identifier of 5566 for the first granset 610, and/or other properties. The granset identifier 5566 may be written into inodes of storage items within the set of storage items in order to identify what storage items are within the consistency group. The first granset 610 may comprise a consistency group identifier that identifies a file (A) and a file (C) as being within the consistency group.

A second granset 616 may be constructed to track, manage, and/or provide access to the set of mirrored storage items 618 within the consistency group. The second granset 616 may comprise an access type property providing read only access to the set of mirrored storage items 618, a redirection property allowing direct access to mirrored storage items within an active file system, a fencing property that fences rename and delete operations to the set of mirrored storage items 618, a snapshot ID for redirection, a granset identifier of 6677 for the second granset 616, and/or other properties. The granset identifier 6677 may be written into inodes of mirrored storage items within the set of mirrored storage items 618 in order to identify what mirrored storage items are within the consistency group. The second granset 616 may comprise a consistency group identifier that identifies a mirrored file (A) and a mirrored file (C) as being within the consistency group.

A generation number 614 may be negotiated between a file system layer of the storage controllers and a replication layer, associated with the synchronous replication relationship 608, used to replicate data of the set of storage items 612 to the set of mirrored storage items 618. The generation ID 614 may be associated with or stored within the gransets. In this way, if an incoming operation is not labeled with the generation number 614 by the replication layer, then the incoming operation is rejected because the incoming operation was not adequately tracked for replication (e.g., not captured within a dirty region log used to track dirty data at the first storage controller 602 not yet replicated to the second storage controller 604 and/or not captured within a last snapshot used to transfer data from the first storage controller 602 to the second storage controller 604).

FIG. 6B illustrates the first storage controller 602 failing 630 or having a planned shutdown, such that the first storage controller 602 is unable to provide clients with access to the set of storage items 612 within the consistency group. Accordingly a failover operation may be performed to failover 632 from the first storage controller 602 to the second storage controller 604 so that the second storage controller 604 can provide clients with failover access to replicated data within the set of mirrored storage items 618 in place of the set of storage items 612 previously accessible through the first storage controller 602 to clients before the first storage controller 602 failed. The access type property of the second granset 616 may be modified 634 to provide read and write access for clients to the set of mirrored storage items 618. While the second storage controller 604 is providing clients with access to the set of mirrored storage items 618, data within the set of mirrored storage items 618 may be modified, and thus diverge from data within the set of storage items 612.

FIG. 6C illustrates the first storage controller 602 recovering from the failure 630. Accordingly, a failback operation 640 may be performed to failback control, of providing clients with access to data, from the second storage controller 604 to the first storage controller 602 so that the first storage controller 602 can provide clients with primary access to data within the first set of storage items 612. In an example, a redirection property may be set such as to an identifier of a snapshot (X) 643 (e.g., before a cutover to being in-sync upon which the redirection property may be cleared to none) because an active file system may comprise app inconsistent data during resync and thus should not be exposed for access (e.g., all I/O is redirected to the snapshot (X) 643). In an example, the redirection property of the second granset 616 is none because the access type property of the second granset 616 is read and write. During the failback operation 640, a resynchronization phase may be performed to resynchronize the set of storage items 612 to a current state of the set of mirrored storage items 618 (e.g., to update the set of storage items 612 with modifications made to the set of mirrored storage items 618 during the failover operation). During the resynchronization phase, the access type property within the first granset 610 may be modified 641 to provide read only access to the storage items within the set of storage items 612 because the set of storage items 612 are the target of the resynchronization (e.g., the set of storage items 612 are being updated with data to a current state of the set of mirrored storage items 618). In this way, normal operation may resume after resync is complete and thus the setup returns back to an initial state, as illustrated in FIG. 6A.

Figure 7:
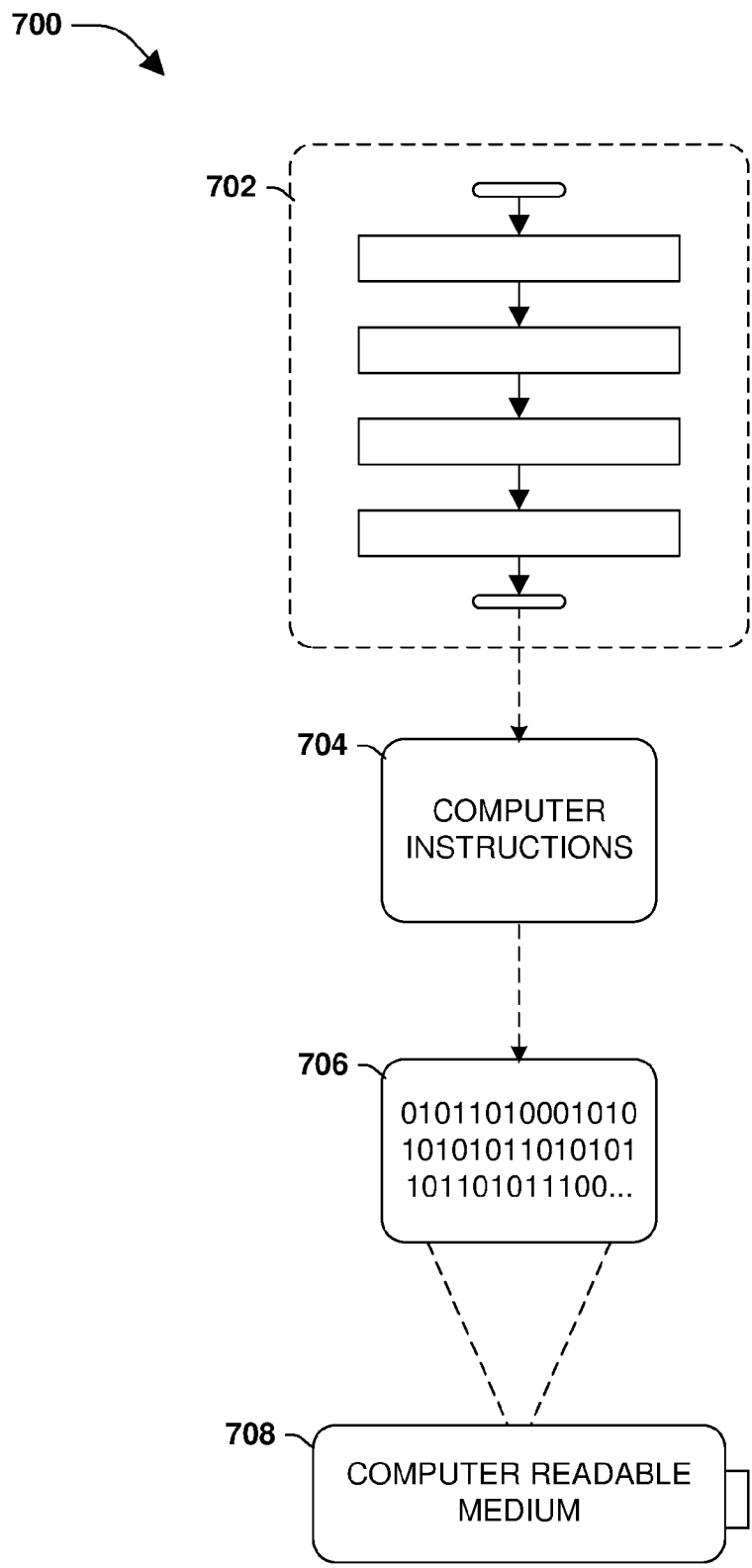
FIG. 7 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-ft DVD-R, flash drive, a platter of a hard disk drive, etc., on which is encoded computer-readable data 706. This computer-readable data 706, such as binary data comprising at least one of a zero or a one, in turn comprises a processor-executable computer instructions 704 configured to operate according to one or more of the principles set forth herein. In some embodiments, the processor-executable computer instructions 704 are configured to perform a method 702, such as at least some of the exemplary method 300 of FIG. 3 and/or at least some of the exemplary method 500 of FIG. 5, for example. In some embodiments, the processor-executable computer instructions 704 are configured to implement a system, such as at least some of the exemplary system 400 of FIGS. 4A-4G and/or at least some of the exemplary system 600 of FIGS. 6A-6D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

maintaining a first granset for a set of storage items of a consistency group and a second granset for a set of mirrored storage items maintained as replicas of the set of storage items, the first granset specifying a first access type for the set of storage items and the second granset specifying a second access type for the set of mirrored storage items, wherein identifiers of the set of storage items are mapped to a granset identifier of the first granset; and processing operations targeting the set of storage items by filtering operations requesting access different than the first access type that is allowed and processing operations targeting the set of mirrored storage items by filtering operations requesting access different than the second access type that is allowed, wherein an operation targeting the set of storage items is processed using data from a snapshot based upon the first granset comprising a redirection property specifying that operations targeting the set of storage items are to be redirected to the snapshot of the consistency group.

2. The method of claim 1, comprising:
atomically creating the first granset with the first access type.

3. The method of claim 1, comprising:
negotiating a generation number between a file system layer of a first storage controller and a replication layer used to replicate data of the set of storage items to the set of mirrored storage items, wherein incoming operations labeled with the generation number are executed and incoming operations without the generation number are rejected.

4. The method of claim 1, comprising:
atomically creating the first granset with the first access type, a first state, a first fencing property, a first redirection property, and the granset identifier, wherein the granset identifier is atomically assigned to inodes of storage items within the set of storage items.

5. The method of claim 1, comprising:
storing a first fencing property within the first granset, the first fencing property specifying types of operations that are to be fenced from being implemented upon storage items within the set of storage items.

6. The method of claim 1, comprising:
utilizing the first granset to enumerate the storage items within the set of storage items as being assigned to the consistency group.

7. The method of claim 1, comprising:
modifying the second access type from a read only property to a read and write property for the set of mirrored storage items based upon identifying a failover from a first storage controller hosting the set of storage items to a second storage controller hosting the set of mirrored storage items for providing clients with failover access to the set of mirrored storage items.

8. The method of claim 7, comprising:
performing a resynchronization to update the set of storage items using updated data of the set of mirrored storage items based upon identifying a failback from the second storage controller to the first storage controller.

9. The method of claim 8, comprising:
setting the first access type to the read and write property and clearing a redirection property to allow I/O access to an active file system and setting the second access type to the read only property and setting a second redirection property of the second granset to redirect I/O to a target snapshot based upon the resynchronization completing.

10. The method of claim 1, wherein the set of storage items are stored across multiple volumes.

11. The method of claim 1, comprising:
utilizing the first granset to perform an item move on demand operation to move a group of storage items within the set of storage items from a first volume to a second volume using an I/O fence for the group of storage items.

12. The method of claim 1, wherein the set of storage items are stored across first storage, hosted by a first storage controller, and second storage hosted by a third storage controller.

13. The method of claim 1, comprising:
updating the first granset to include a storage item based upon a request to add the storage item to the set of storage items, wherein an inode of the storage item is modified to comprise the granset identifier.

14. The method of claim 1, comprising:
updating the first granset to exclude a storage item based upon a request to delete the storage item from the consistency group, wherein an inode of the storage item is updated to remove the granset identifier of the first granset used to identify the consistency group.

15. The method of claim 1, comprising:
modifying at least one of a fencing property, a redirection property, a state property, and the first access type of the first granset based upon a modify command.

16. The method of claim 1, comprising:
maintaining a hash table mapping unique identifiers of storage items within the set of storage items of the consistency group to the granset identifier of the first granset.

17. The method of claim 1, comprising:
maintaining a granset metafile to store a plurality of gransets, the granset metafile comprising granset property blocks corresponding to properties within gransets and storage item blocks corresponding to storage items within consistency groups.

18. The method of claim 1, comprising:
utilizing the first granset to perform an item restore upon a group of storage items within the set of storage items using an I/O fence for the group of storage items.

19. A non-transitory machine readable medium comprising machine executable code which when executed by a machine, causes the machine to:
maintain a first granset for a set of storage items of a consistency group and a second granset for a set of mirrored storage items maintained as replicas of the set of storage items, the first granset specifying a first access type for the set of storage items and the second granset specifying a second access type for the set of mirrored storage items, wherein identifiers of the set of storage items are mapped to a granset identifier of the first granset;
negotiating a generation number between a file system layer of a first storage controller and a replication layer used to replicate data of the set of storage items to the set of mirrored storage items, wherein incoming operations labeled with the generation number are executed and incoming operations without the generation number are rejected; and
process operations targeting the set of storage items by filtering operations requesting access different than the first access type that is allowed and processing operations targeting the set of mirrored storage items by filtering operations requesting access different than the second access type that is allowed.

20. A computing device comprising:
a memory comprising machine executable code for performing a method; and
a processor coupled to the memory, the processor configured to execute the machine executable code to cause the processor to:
maintain a first granset for a set of storage items of a consistency group and a second granset for a set of mirrored storage items maintained as replicas of the set of storage items, the first granset specifying a first access type for the set of storage items and the second granset specifying a second access type for the set of mirrored storage items, wherein identifiers of the set of storage items are mapped to a granset identifier of the first granset, wherein the first granset is atomically created with the first access type, a first state, a first fencing property, a first redirection property, and the granset identifier atomically assigned to inodes of storage items within the set of storage items; and process operations targeting the set of storage items by filtering operations requesting access different than the first access type that is allowed and processing operations targeting the set of mirrored storage items by filtering operations requesting access different than the second access type that is allowed.

* * * * *